3,234,049
NICKEL ALKALINE STORAGE CELL OR BATTERY
POSITIVE ELECTRODE
Richard Joseph Doran, Fleet, Aldershot, England, assignor to National Research Development Corporation, London, England
No Drawing. Filed Oct. 2, 1961, Ser. No. 142,025
Claims priority, application Great Britain, Oct. 7, 1960, 34,429/60
4 Claims. (Cl. 136—28)

This invention relates to electric cells or batteries and especially to storage cells of nickel-alkali type.

Such cells having sintered plates of known type are currently used in applications where the requirements, including maximum acceptable weight and volume, are so stringent sometimes as to exceed the capabilities of conventional cells even when these are of the recent kind having cobalt added to the nickelous active material to give increased acceptance and retention of charge and to inhibit deterioration of electrochemical activity.

The invention has for an object to provide improved nickel-hydroxide plates or electrodes for nickel-alkali cells.

According to the invention, a positive nickel-alkali cell plate or electrode includes in its active material a proportion of scandium in the range of from one half of one atom percent to twenty five atoms percent of the metal atoms in the active material.

At a proportion of twenty-five atom percent the beneficial effects of the scandium begin to be outweighed by loss of electrical capacity due to its bulk.

As compared with nickel-alkali cells without scandium in the positive active material, nickel alkali cells employing positive electrodes including scandium in accordance with the invention have the following advantages: The voltage of a cell on discharge is of increased value and the relatively rapid fall of voltage at the early part of the discharge is substantially reduced. The irreversibility is considerably less as compared with the cell without scandium in the active positive material. Moreover, on charge, the final, "top-of-charge" voltage (oxygen overpotential) is significantly higher so that the cell is likely to be more stable than those without scandium when subjected to constant-voltage charging, as, for example, in aircraft, and it is certainly compatable to charging by conventional constant-voltage charging apparatus as, for example, in aircraft.

It is commonly the practice to produce the active material of a positive nickel-alkali cell electrode by precipitation with alkali from a solution of nickel salt, with or without cobalt salt, and the scandium may conveniently be incorporated in the active material by providing a quantity of scandium salt in the solution prior to the precipitation.

Any of the known methods of producing positive nickel alkali electrodes, typically including impregnation of a porous plaque under vacuum or otherwise, precipitation of hydroxide in an alkali solution and electrolytic treatment whilst in said solution, may be used for the manufacture of positive nickel alkali electrodes according to the invention, by using an aqueous solution of suitable nickel and scandium salts.

Using an aqueous solution of nickel nitrate and scandium nitrate, to impregnate porous, sintered-nickel plaque of known type by immersion therein under vacuum, and subsequently precipitating and treating in caustic alkali solution, and, using electrodes prepared in this way, the results indicated in the tables below have been obtained for the different proportions of scandium indicated.

TABLE A

*Increase of voltage during discharge in millivolts*

|  | Atom percent of Scandium | | | | | | |
|---|---|---|---|---|---|---|---|
|  | 0 | 2½ | 5 | 10 | 15 | 20 | 25 |
| (1) At start (mv.) | 0 | 5 | 10 | 20 | 27 | 35 | 35 |
| (2) At one third discharge (mv.) | 0 | 25 | 55 | 95 | 120 | 130 | 130 |

This table shows the amount by which the voltage during discharge is increased by the inclusion of different proportions of scandium over comparable cells without scandium in the positive active material. Line (1) refers to the voltage increase at the commencement of discharge of a fully charged cell which has been allowed to stand at open circuit for some time and line (2) refers to the voltage increase at one third discharge.

TABLE B

*Magnitude of voltage drop on discharge between the initial fully charged and the one-third discharged states, in millivolts*

|  | Atom percent of Scandium | | | | | | |
|---|---|---|---|---|---|---|---|
|  | 0 | 2½ | 5 | 10 | 15 | 20 | 25 |
| Initial voltage drop in discharge, mv. | 155 | 135 | 110 | 80 | 62 | 60 | 60 |

In this table, the magnitude of the initial relatively rapid fall of potential on discharge is represented as the difference between the initial potential of a fully charged cell at the commencement of discharge and the potential thereof when one third discharged.

TABLE C

*Magnitude of the voltage difference, for the half-charged state, between charging and discharging*

|  | Atom percent of Scandium | | | | | | |
|---|---|---|---|---|---|---|---|
|  | 0 | 2½ | 5 | 10 | 15 | 20 | 25 |
| Voltage difference (mv.) | 130 | 85 | 75 | 65 | 65 | 65 | 65 |

This table clearly indicates the reduced difference between charging and discharging voltages for the half-charged condition for the indicated different proportions of scandium incorporated in the positive active material. In each case the figure is the difference between the working potential half way through charge and half way through discharge, respectively, on a typical full cycle. It will be seen that such small amounts of scandium as 2½ or 5 atom percent substantially reduce said differences and correspondingly improve reversibility and that with 10 or more percent of scandium the difference is only ½ of that which is experienced with a comparable cell having no scandium.

The results given in the tables were obtained when working under medium rate, constant-current conditions at ordinary temperatures. They are, however, typical of many that have been obtained under various conditions and temperatures.

The active material of a positive nickel alkali cell electrode according to the invention may include cobalt as well as scandium. It has been found that the beneficial effects commonly associated with the presence of cobalt in the active material are essentially unaffected by the presence of scandium as well, and, conversely, that the beneficial effects due to the scandium are not appreciably affected by the cobalt.

I claim:

1. In a nickel alkaline storage cell or battery, a positive electrode having an active material comprising nickel and a small proportion of scandium wherein the proportion of scandium is between one half of one atom percent and twenty-five atom percent of metal atoms in the active material.

2. In a nickel alkaline storage cell or battery, a positive electrode according to claim 1 wherein the proportion of scandium is between one atom percent and twenty atom percent of metal atoms in the active material.

3. In a nickel alkaline storage cell or battery, a positive electrode according to claim 1 wherein the scandium is incorporated in the active material by precipitation from a solution of nickel and scandium salts.

4. A nickel alkaline storage cell comprising an alkaline electrolyte, a negative electrode and a positive electrode having an acting material comprising nickel and a small proportion of scandium wherein the proportion of scandium is between one half of one atom percent and twenty-five atom percent of metal atoms in the active material.

References Cited by the Examiner

UNITED STATES PATENTS

| | | | |
|---|---|---|---|
| 1,167,485 | 1/1916 | Edison. | |
| 2,626,294 | 1/1953 | Brennan | 136—28 |
| 2,634,303 | 4/1953 | Moulton | 136—24 |
| 2,771,499 | 11/1956 | Fleischer | 136—28 |

OTHER REFERENCES

Mellor: Comprehensive Treatise on Inorganic and Theoretical Chemistry, 1924, vol. 5, pages 494–395.

WINSTON A. DOUGLAS, *Primary Examiner.*

JOHN H. MACK, MURRAY TILLMAN, *Examiners.*